United States Patent [19]

Matsui et al.

[11] Patent Number: 5,079,825
[45] Date of Patent: Jan. 14, 1992

[54] METHOD OF MANUFACTURING COMPOSITE STRUCTURES

[75] Inventors: Shigetomo Matsui, Higashiosaka; Takeshi Yamada, Kobe; Yasuhiro Kumon, Kobe; Makoto Ryoji, Kobe; Shigeki Koe, Kobe; Hiroatsu Asari, Kobe; Toshihiko Ishizuka, Ashiya; Shigemi Murakami, Kobe, all of Japan

[73] Assignee: Kawasaki Jukogyo Kabushiki Kaisha, Kobe, Japan

[21] Appl. No.: 507,569

[22] Filed: Apr. 11, 1990

Related U.S. Application Data

[62] Division of Ser. No. 213,286, Jun. 28, 1988.

[30] Foreign Application Priority Data

| Jul. 1, 1987 | [JP] | Japan | 62-164848 |
| Jul. 1, 1987 | [JP] | Japan | 62-164849 |
| Jul. 1, 1987 | [JP] | Japan | 62-164850 |
| Jul. 1, 1987 | [JP] | Japan | 62-164851 |
| Jul. 1, 1987 | [JP] | Japan | 62-164852 |

[51] Int. Cl.⁵ .................................. B23P 11/00
[52] U.S. Cl. .................................. 29/520; 29/521
[58] Field of Search ........... 428/609; 164/111; 29/505, 512, 514, 515, 520, 521, 522.1, 523, 525, 525.1, 525.2, 527, 530, 130

[56] References Cited

U.S. PATENT DOCUMENTS

| 121,036 | 11/1871 | Aiken . |
| 309,439 | 12/1884 | Chillingworth et al. . |
| 312,485 | 2/1885 | Makin . |
| 543,192 | 7/1895 | Rodig . |
| 558,271 | 4/1896 | Falk . |
| 1,209,948 | 12/1916 | Dodds . |
| 1,610,945 | 12/1926 | Goldsmith et al. . |
| 1,622,825 | 3/1927 | Goldsmith et al. . |
| 1,680,369 | 8/1928 | Dugan . |
| 1,692,529 | 11/1928 | Zagorski . |
| 1,990,140 | 2/1935 | Seiferth . |
| 2,157,456 | 5/1939 | Koyemann . |
| 2,262,074 | 11/1941 | Welty . |
| 2,285,583 | 6/1942 | Jennings et al. . |
| 2,361,089 | 10/1944 | Cox .................. 29/DIG. 31 X |
| 2,490,548 | 12/1949 | Schultz . |
| 2,639,119 | 5/1953 | Greenwald ........... 29/521 X |
| 2,775,030 | 12/1956 | Weiss ................... 29/530 |
| 2,793,571 | 5/1957 | Way et al. . |
| 2,888,742 | 6/1959 | Stumbock . |
| 3,100,930 | 8/1963 | Nihlen et al. ....... 29/527.5 X |
| 3,131,471 | 5/1964 | Nieter ................. 29/521 |
| 3,175,893 | 3/1965 | Meretsky ............ 29/117 X |
| 3,526,420 | 9/1970 | Brancaleone ....... 29/521 X |
| 3,529,858 | 9/1970 | Haller . |
| 3,682,227 | 8/1972 | Motz et al. . |
| 3,871,264 | 3/1975 | Hallock .............. 29/521 X |
| 3,888,296 | 6/1975 | Vernia et al. . |
| 4,005,991 | 2/1977 | Uebayasi et al. . |
| 4,023,613 | 5/1977 | Uebayasi et al. . |
| 4,111,572 | 2/1978 | Noone et al. . |
| 4,599,772 | 7/1986 | Graham . |

FOREIGN PATENT DOCUMENTS

| 356109 | 7/1922 | Fed. Rep. of Germany . |
| 758303 | 7/1953 | Fed. Rep. of Germany . |
| 1133089 | 7/1962 | Fed. Rep. of Germany . |
| 507264 | 9/1920 | France . |
| 874135 | 9/1942 | France . |
| 1255831 | 1/1961 | France . |
| 55-139540 | 10/1980 | Japan . |
| 165264 | 7/1986 | Japan ................. 164/111 |
| 1-34501 | 2/1989 | Japan . |

Primary Examiner—Mark Rosenbaum
Assistant Examiner—Frances Chin
Attorney, Agent, or Firm—Wenderoth, Lind & Ponack

[57] ABSTRACT

A composite structure is manufactured by joining a first material, preferably made of a magnetically permeable material having a first joining surface in which a recess having an overhang surface is formed, to a second material, preferably made of an electrically conductive material having a second joining surface to be joined to the first joining surface of the first material. On the second joining surface is integrally formed a protrusion having an outer configuration substantially corresponding to the inner shape of the recess. The first and second materials are firmly mechanically joined to each other by, for example, a casting method, a rolling method, a pressing method, or a method utilizing plastic flow of the second material.

6 Claims, 13 Drawing Sheets

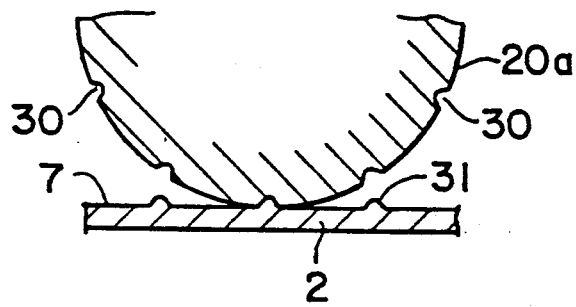
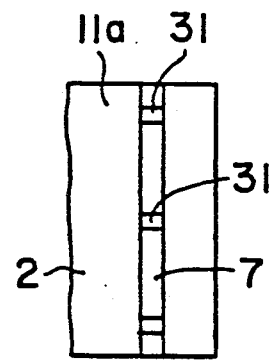
FIG. 24  FIG. 25
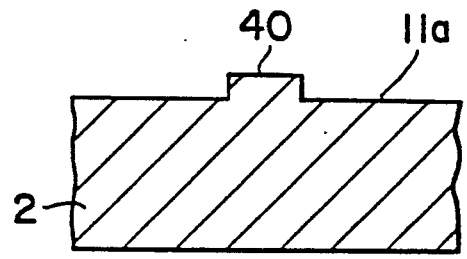
FIG. 26
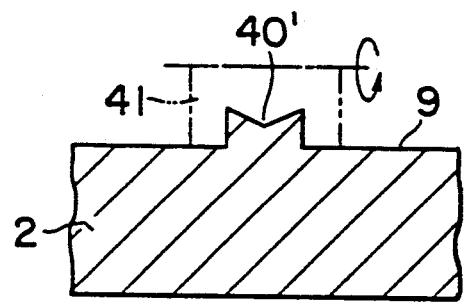
FIG. 27
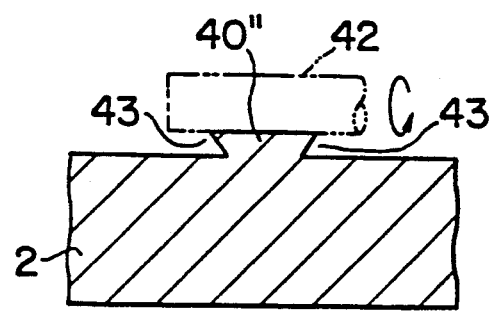
FIG. 28

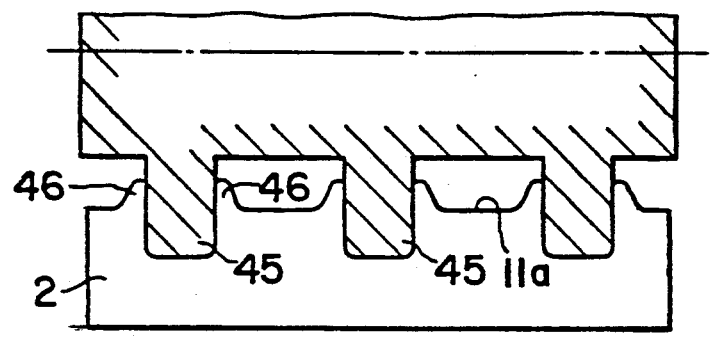
F I G. 29
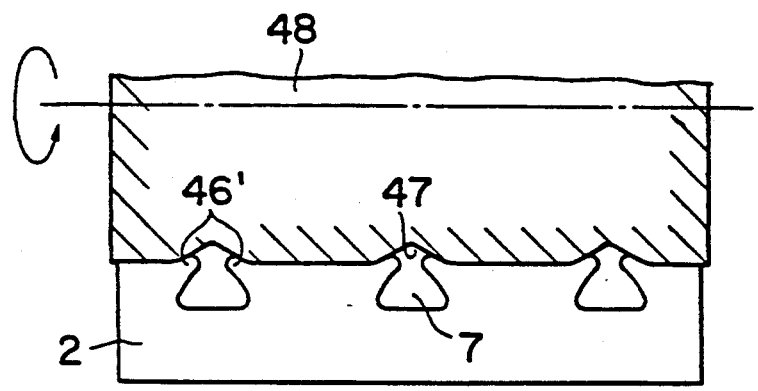
F I G. 30
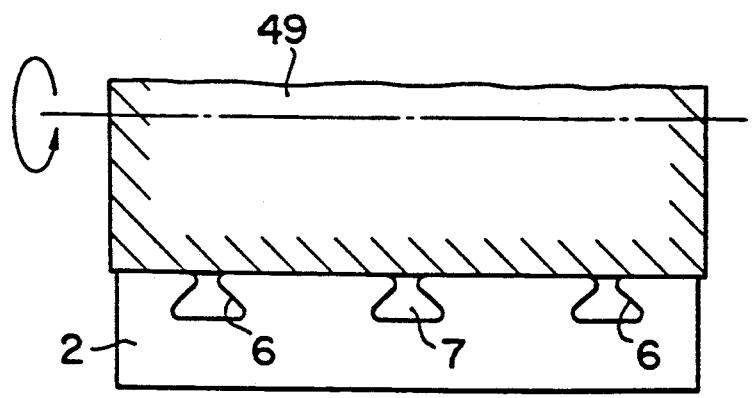
F I G. 31

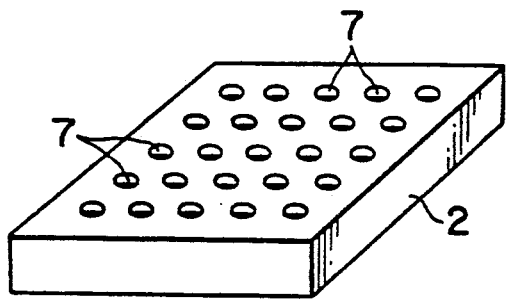
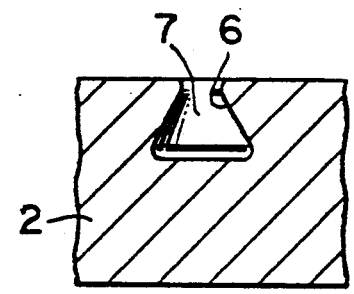
FIG. 32 A  FIG. 32 B
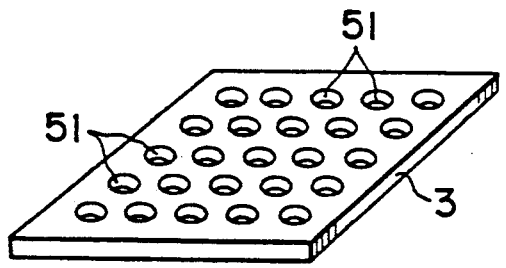
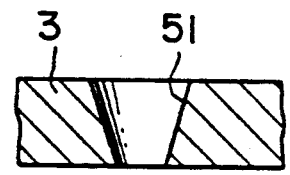
FIG. 33 A  FIG. 33 B
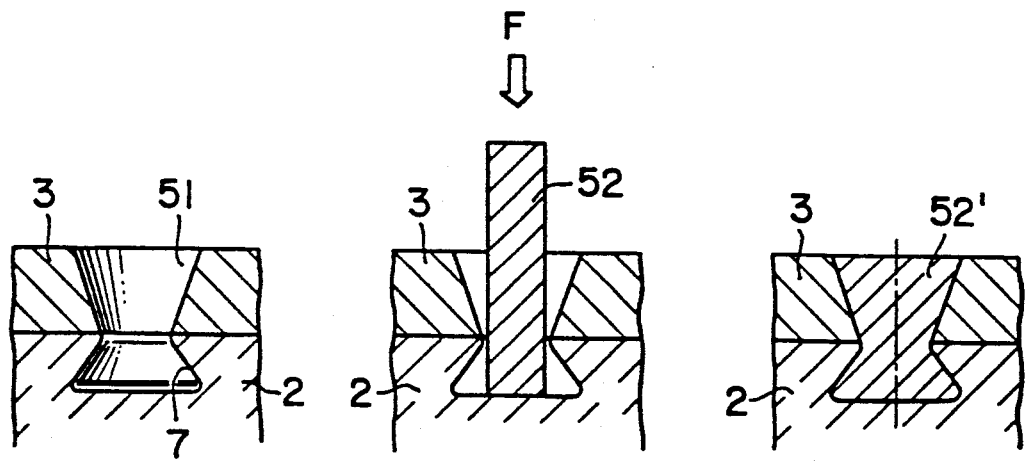
FIG. 34  FIG. 35  FIG. 36

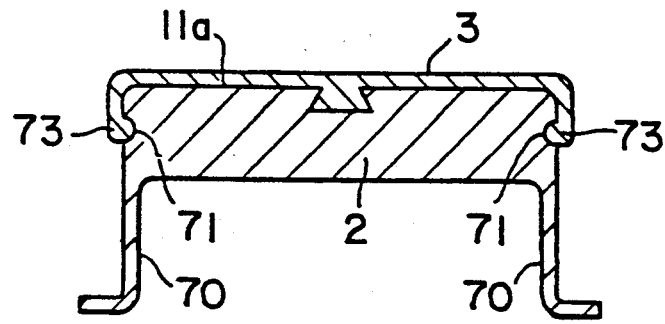
F I G. 62
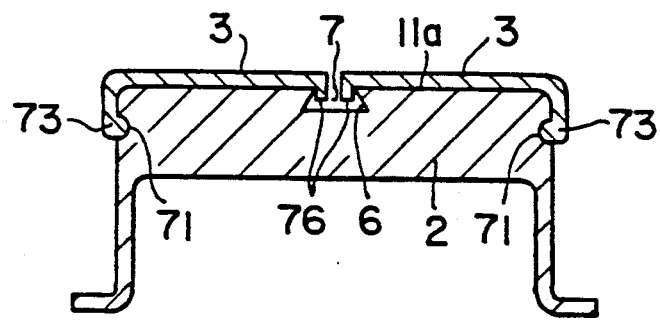
F I G. 63
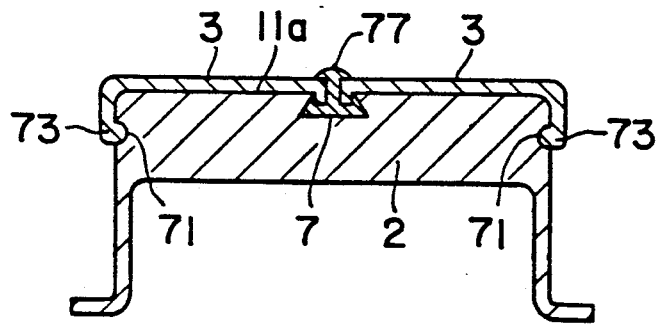
F I G. 64
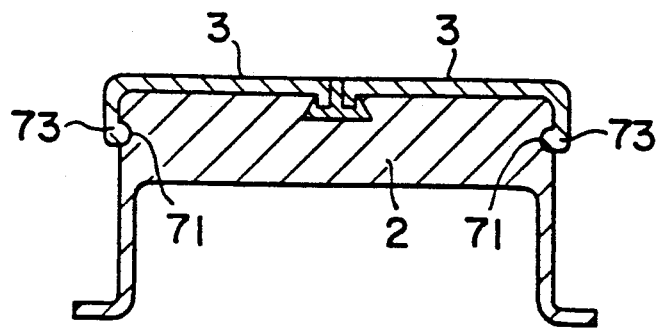
F I G. 65

METHOD OF MANUFACTURING COMPOSITE STRUCTURES

This is a divisional application of Ser. No. 07/213,286, filed June 28, 1988 pending.

BACKGROUND OF THE INVENTION

This invention relates to manufacture of composite structures fabricated by joining materials of dissimilar or different kinds and relates particularly to methods of manufacturing a composite structure to be utilized, for example, as a secondary plate of a railway track of a linear motor car, for inducing an electric driving force for moving such motor car.

As is well known, traffic facilities have occupied a significant and important position in society, and among various traffic facilities, transportation by railway plays an important role in rapid mass transportation, apart from transportation by automobiles.

However, as the speed of railway transportation has been increased, vibrations and noises that result have become factors that cannot be neglected by society. Another aspect of railway transportation is the ever increasing costs of increasingly larger scale excavating and drilling operations for underground railway tunnels, for these reasons, development of a linear motor car capable of travelling along an iron railway track without generating violent vibrations or noises is highly desired and has been partially realized.

In connection with the linear motor car of the character described above, a structure of a secondary plate, which functions to produce eddy currenes, in a primary side of the motor car for producing a driving force, must be used on the railway track. Such secondary plate is required to have high electric conductivity and magnetic permeability as well as great resistance against shearing forces and separating forces which are generated as counter forces against the great driving force. However, in the current technique, a single metal or metallic material having these characteristics has not been developed, and accordingly, a composite structure fabricated by tightly and firmly joining materials of different types and having a high electric conductivity and a high magnetic permeability, respectively, is utilized as the secondary plate.

For example, there are known composite structures fabricated by fixedly joining face to face an aluminum plate having high electric conductivity on a soft steel plate having high magnetic permeability. In an example of such composite structures, the aluminum plate is press-fitted at opposite ends thereof on two end surfaces of the soft steel plate, and fastening screws are passed through the aluminum plate into the soft steel plate to mechanically join the plates as a combined metallic structure. In another example, a composite structure is obtained by joining the aluminum plate to the soft steel plate by an explosion bonding method into an explosion bonded clad plate.

However, as described hereinbefore, it is required for the secondary plate to possess mechanical strength against the strong reacting forces to the driving force, acting frequently and repeatedly, and accordingly, the secondary plate must have a large resistance against shearing forces along the interface between the two elementary plates as well as against vertical separating forces imparted to the two elementary plates of the secondary plate. Particularly, when a composite structure is employed with a railway track of a subway, it is required for the composite structure to have mechanical strength or resistance against additional thermal behavior and separating forces due to temperature variations and dynamic vibrations. However, the composite structures fabricated by pressforming the two plates and then clamping by fastening screws or fabricated by the explosion bonding method cannot maintain sufficient resistance for a long period of time.

Particularly, the composite structure, in which an aluminum plate and a soft steel plate are mechanically joined by pressing them and clamping them by means of bolts, tends to be loosened as time elapses, while the explosion bonding method is extremely expensive, thus being not advantageous.

Moreover, when the composite structures of the characters described above are applied to the railway track of subways, for example, sited near a seaside, the railway tracks are exposed to severe environmental conditions such as corrosion or submergence, and the interface between the soft steel plate and the aluminum plate is corroded. When corrosion occurs, the composite structure cannot perform the function of a secondary plate for a railway track.

SUMMARY OF THE INVENTION

Accordingly, an object of this invention is to substantially eliminate defects or drawbacks encountered in the conventional techniques described hereinbefore and to provide methods of manufacture of composite structures fabricated by materials of different kinds and capable of maintaining for a long period of time a firm mechanically joined condition of the different materials without causing relative shifting and separation of the joined surfaces of the materials, even when the composite structure is exposed to an environment in which repeatedly acting strong shearing stresses and violent thermal behavior are imparted to the composite structure.

Another object of this invention is to provide methods of manufacture of composite structures of the character described above and at low cost.

A further object of this invention is to provide various methods of manufacturing the composite structures of the characters described above.

These and other objects can be achieved, in accordance with this invention, by providing a composite structure fabricated from materials of different kinds, which structure comprises a first material provided with a first joining surface in which is formed at least one recess having an overhang surface, and a second material provided with a second joining surface joined face to face to the first joining surface, said second joining surface having thereon at least one protrusion having an underhang surface and formed integrally with the second material, the protrusion having a shape and dimensions substantially corresponding to those of the recess and being firmly engaged with the recess in a manner fully filling the same.

According to this invention, there is provided one method of manufacturing a composite structure of the character described above, which method comprises the steps of preparing a first material with a first joining surface, having therein at least one recess having an overhang side surface, placing the first material in a casting mold in a manner to leave a space having a predetermined width between the first joining surface of the first material and an inner surface of the casting mold, pouring a second material in a molten state into the space to fill the second material into the recess of the first material and to bond a second joining surface of the second material entirely to the first joining surface of the first material, and removing the thus bonded first and second materials from the casting mold.

A further method of manufacturing a composite structure fabricated from materials of different kinds, comprises the steps of preparing a first material having a first joining surface, forming at least one recess having an overhang side surface in the first joining surface of the first material, preparing a second material having a second joining surface, and opposing the first and second joining surfaces of the first and second materials and pressing the opposed first and second materials from one side thereof to cause plastic flow of the second material into the recess to cause the second material to be filled into the recess of the first material.

A still further method of manufacturing a composite structure made from materials of different kinds, comprises the steps of preparing a first material having a first joining surface in which is formed at least one recess in the shape of a local hole having an overhang surface, preparing a second material having a second surface and provided with at least one local through hole having an underhang surface, placing the second material on the first material in such a manner that the first and second joining surfaces contact each other with the through hole of the second material aligning with the recess of the first material, inserting an anchoring material into the through hole and the recess, and plastically deforming the anchoring material to cause it to entirely fill the through hole and the recess.

A still further method of manufacturing a composite structure made from materials of different kinds, comprises the steps of preparing a first material having a first joining surface, forming at least one recess having an overhang surface in the first material, preparing a pair of second materials each in the shape of a plate, fixedly mounting the second materials on the first joining surface of the first material, the plates of the second materials having first ends opposing each other with a space therebetween above the recess of the first material, filling a third material into the recess and a space between the opposed ends of the second materials to form a build-up weld, and removing part of the build-up weld such that an outer surface of the filled third material is flush with the outer surfaces of the second materials.

In preferred embodiments of this invention, the first material is made of a magnetically permeable material and the second material is made of an electrically conductive material.

The composite structure thus manufactured can provide a firm mechanically joined condition between the first and second materials by virtue of the firm engagement of the overhang surface of the recess of the first material with the underhang surface of the protrusion of the second material.

BRIEF DESCRIPTION OF THE DRAWINGS

In the accompanying drawings:

FIG. 24 is a cross sectional view representing a step to form a recess in a surface of a first material of a composite structure formed according to a still further embodiment of this invention;

FIG. 25 is a plan view showing a portion of the first material in which a recess is formed by the step shown in FIG. 24;

FIG. 26 is a cross sectional view of one of materials constituting a composite structure shown in FIG. 4 representing a first step of forming a recess;

FIGS. 27 and 28 are cross sectional views showing successive steps subsequent to the step shown in FIG. 26;

FIGS. 29 to 31 are cross sectional views illustrative of steps in sequence of forming recesses in a first material constituting a composite structure, according to a method of this invention;

FIG. 32A is a perspective view of a first material of a composite structure according to a still further embodiment of this invention;

FIG. 32B is a fragmentary cross sectional view of the material shown in FIG. 32A;

FIGS. 33A and 33B are views similar to FIGS. 32A and 32B, respectively, showing a second material of the composite structure;

FIGS. 34 to 36 are fragmentary cross sectional views illustrative of steps in sequence for joining the materials shown in FIGS. 32A and 33B;

FIGS. 58 to 62 are cross sectional views explanatory of steps in sequence of joining two different materials to form a composite structure of a still further character, according to a method of this invention; and FIGS. 63 to 65 are cross sectional views explanatory of modified steps of those shown in FIGS. 58 to 62 in sequence of joining two different materials to form a composite structure.

DESCRIPTION OF THE PREFERRED EMBODIMENTS

Preferred embodiments of this invention will be described hereunder with reference to a secondary plate of an iron track for a linear motor car railway in conjunction with the accompanying drawings.

Figure 1A:
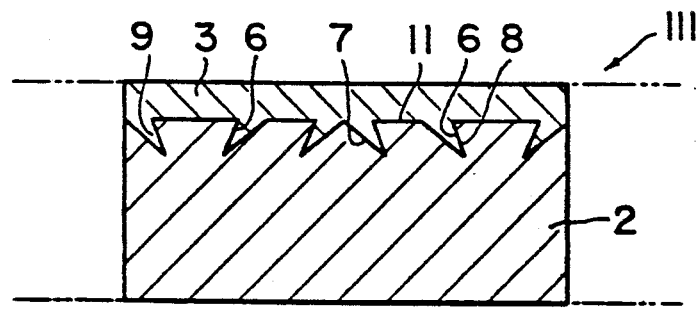
FIG. 1A is a cross sectional view of one embodiment of a composite structure comprising materials of different types formed according to this invention.

FIG. 1A shows an embodiment of this invention in the form of a secondary plate 111 of an iron track, formed as a composite structure made of materials of dissimilar or different types. The composite structure comprises a soft steel plate 2 as a first material having a high magnetic permeability, and an aluminum plate 3 as a second material having a good electric conductivity and disposed on the soft steel plate 2, both plates 2 and 3 being joined mechanically along an interface 11.

Figure 1B:
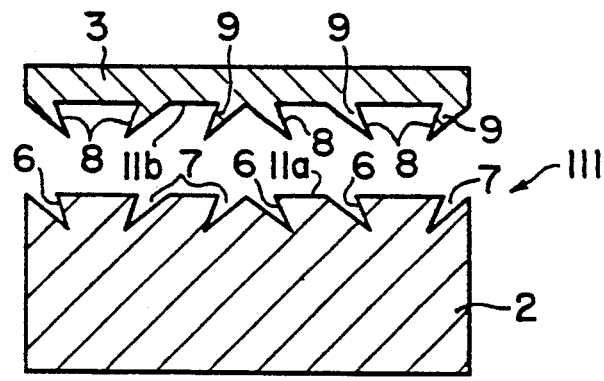
FIG. 1B is a cross sectional view of the materials, shown as being separated, of the composite structure shown in FIG. 1A.

FIG. 1B shows the composite structure in a state wherein the two plates 2 and 3 are separated. As is apparent from FIG. 1B the steel plate 2 is provided with an upper joining surface 11a in which are formed a plurality of grooves or recesses 7 each converging downwardly in cross section to form a V-shape and each being obliquely oriented so as to have one side surface 6 constituted as an overhang surface, which protrudes horizontally as it extends upwards as viewed in FIG. 1B. The angle of the oblique direction and the arrangement of the grooves 7 may be changed or modified in accordance with conditions of design.

The aluminum plate 3 is provided with a lower joining surface 11b on which are formed a plurality of projections or protrusions 9 each converging downwardly in cross section to form a V-shape and each projecting obliquely so as to have one side surface 8 constituted as an underhang surface which protrudes horizontally as it extends downwards as viewed in FIG. 1B.

The locations and shapes of the grooves 7 of the steel plate 2 are made to accord with those of the corresponding projections 9 of the aluminum plate 3 in the joined state. Although, in the illustration of FIG. 1B, the plates 2 and 3 are separated, actually these plates 2 and 3 are firmly mechanically joined together in the manufacturing process of the composite structure 111 according to this invention, for example, by casting the projections into the grooves 7 or by pressing the plate 3 against the plate 2 by means of a pressing roll to establish firm engagement of the projections 9 with the corresponding grooves 7 described in detail hereafter.

The composite structure 111 can thus be formed integrally as one body with extremely high joining force and resistance aginst shearing forces in both the longitudinal and transverse directions, as well as against vertical separating forces based on thermal behavior due to temperature changes.

With the composite structure of the character described above, in a case where a linear motor car, not shown, travels above the secondary plate 111 with a predetermined height of floatation, eddy currents are generated through the aluminum plate 3, which produces a driving force for the linear motor car. During the travel of the car, the aluminum plate 3 receives a large reaction force as a result of the driving force in the longitudinal direction thereof. However, because of great resisting forces against the reaction forces and the shearing forces in a direction normal to the longitudinal direction and because of a great resistance in a vertical direction as viewed in FIG. 1A against separation of the two plates due to the strong mechanical engagement between the overhang surfaces 6 of the grooves 7 of the steel plate 2 and the underhang surfaces 8 of the projections 9 of the aluminum plate 3, the secondary plate is prevented from shifting in height more than a designed allowable change in height. In addition, the tight joining along the interface between the steel plate 2 and the aluminum plate 3 can positively prevent the possibility of corrosion which may be caused by salty sea winds or submergence by flooding and so on, whereby the two plates are prevented from separating, thus constantly maintaining the bonded condition originally designed, and thereby enabling a linear motor car to travel as designed.

Figure 2:
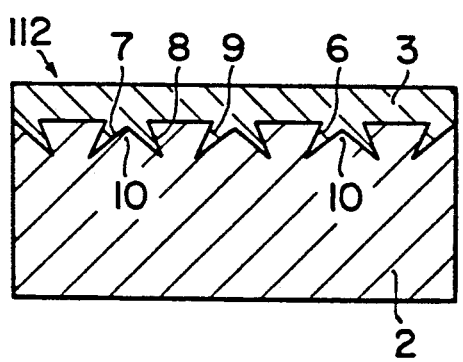
FIG. 2 is a cross sectional view of another embodiment of the composite structure formed according to this invention.

FIG. 2 shows another embodiment of a composite structure 112 according to this invention, in which all grooves or recesses 7 formed in the upper joining surface of the steel plate 2 have therein intermediate ridges or projections 10 directed upwardly to enlarge the joining surface area of the grooves 7 to thereby increase the resistance against shearing forces. The composite structure 112 according to this embodiment is advantageous in that the projections 10 facilitate plastic flow of the material of the aluminum plate 3 into the recesses 7, when the material of the plate 3 is to be pressed into the recesses 7, thus enabling better charging of the material of the plate 3 in the recesses 7.

Figure 3:
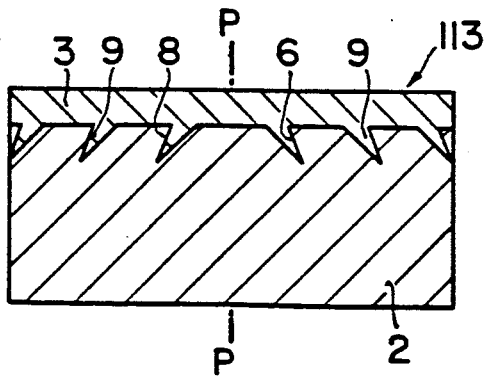
FIGS. 3 to 7 are cross sectional views of further embodiments of the composite structures, formed, according to this invention.

FIG. 3 shows a further embodiment of the composite structure 113 according to this invention, in which the overhang surfaces 6 of the recesses of the steel plate 2 and the underhang surfaces 8 of the projections or protrusions 9 of the aluminum plate 3 are arranged in a symmetrical relation with respect to a plane along the line P—P, and in which all projections 9 extend obliquely in directions away from the plane along the line P—P. This embodiment of the composite structure 113 is effective in a case where the composite structure 113 is installed in a linear portion of a railway track, and is advantageous in that it can be manufactured at low cost because of the symmetrical structure.

Figure 4:
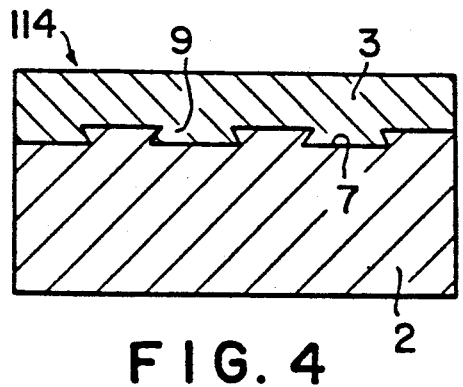

FIG. 4 shows a composite structure 114 according to a still further embodiment of this invention, in which the grooves or recesses 7 of the steel plate 2 and the projections or protrusions 9 of the aluminum plate 3 are both formed in a dovetail shape in cross-section with suitable distances between adjoining pairs of the recess 7 and the projection 9. The composite structure 114 according to this embodiment is advantageous in that it can be produced at low cost with a possibility of various designs and arrangements of the recesses 7 and the projections 9.

Figure 5:
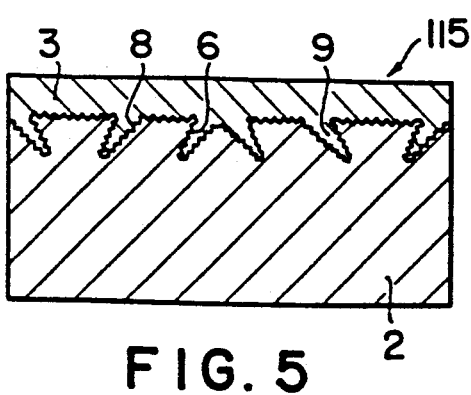

FIG. 5 shows a composite structure 115 according to a still further embodiment of this invention, which has an arrangement of the grooves 7 of the steel plate 2 and the projections or protrusions 9 of the aluminum plate 3, similar to those shown in FIG. 1, but having waved overhang surfaces 6 and underhang surfaces 8 with minute pitches far smaller than those of the grooves 7 and the projections 9, thereby to facilitate firm engagement between the grooves 7 and the projections 9, whereby a strong bond between the steel plate 2 and the aluminum plate 3 can be obtained. According to this embodiment, a strong resisting force against shearing forces and separating forces which may be produced in curved portions of the railway track can be obtained.

Figure 6:
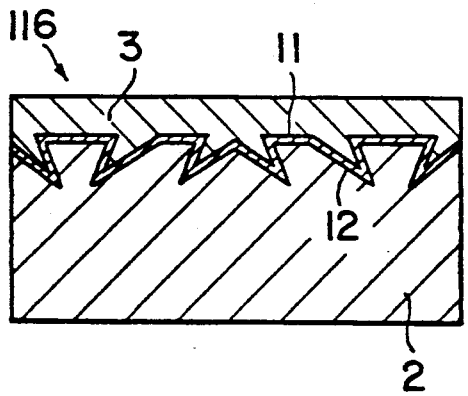

FIG. 6 shows a composite structure 116 according to a still further embodiment of this invention, in which a layer 12 of thin plate made of an electrically insulating material is interposed between the joining surfaces of the soft steel plate 2 and the aluminum plate 3, instead of the direct contact of the metallic materials of different kinds constituting the metal plates 2 and 3 in the aforementioned embodiments. According to the construction of the composite structure 116 shown in FIG. 6, corrosion, which may be caused by an electric potential difference generated between the plates 2 and 3, can be effectively prevented. In addition, since the steel plate 2 and the aluminum plate 3 are tightly joined through the layer 12, a sufficient resisting force against shearing forces and separating forces can be obtained.

Figure 7:
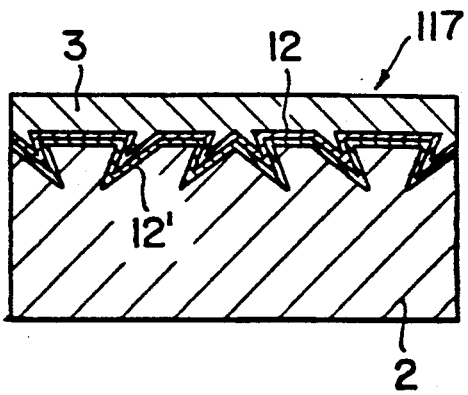

FIG. 7 shows a composite structure 117 according to a still further embodiment of this invention, in which a corrosion proof priming coat 12' is applied to the lower surface of the insulating layer 12 of the embodiment of FIG. 6 for increasing the corrosion proof effect for the steel plate 2. In this embodiment, the corrosion proof coat may be applied to the upper surface of the insulating layer 12, and in a preferred modification a bonding agent having a corrosion proof characteristic may be applied instead of the corrosion proof coat.

Figure 8:
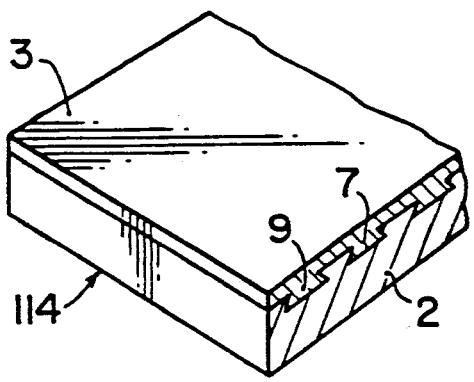
FIG. 8 is a fragmentary perspective view of a still further embodiment of the composite structure formed according to this invention.
Figure 9:
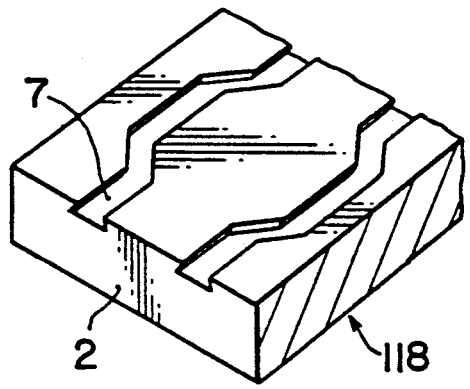
FIGS. 9 and 10 are fragmentary perspective views illustrative of recesses formed in first materials of further embodiments according to this invention.
Figure 10:
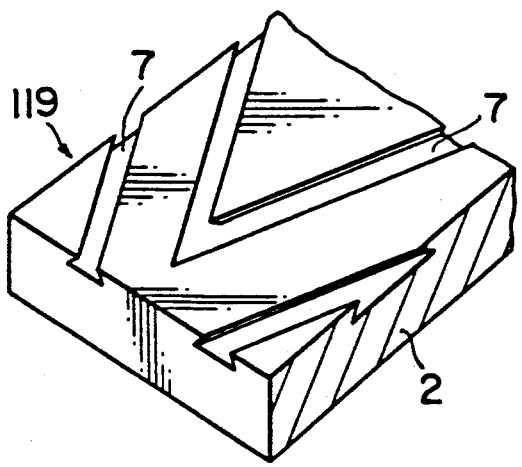

The arrangements or orientations of the grooves or recesses 7 having the overhang surfaces 6 and the projections or protrusions 9 having the underhang surfaces 8 optionally may be made as shown in FIGS. 8, 9 and 10, but the invention is not limited to these arrangements. In FIG. 8, the recesses 7 and projections 9 extend linearly in the same longitudinal or transverse direction. In FIG. 9, the recesses 7 and the projections, not shown, have a bent form. In FIG. 10, the recesses 7 and the projections, not shown, extend obliquely.

Figure 11:
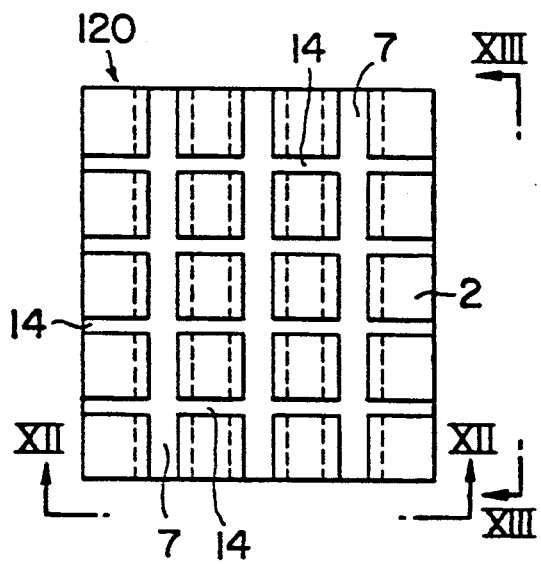
FIG. 11 is a plan view showing one example of a joining surface of a first material of the composite structure formed according to this invention.
Figure 13:
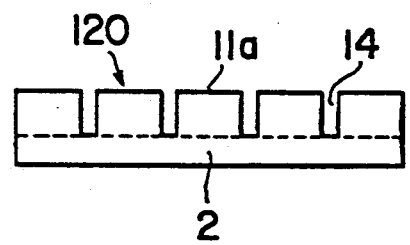
FIGS. 12 and 13 are end views as seen in the directions of arrows XII—XII and XIII—XIII of FIG. 11, respectively.
Figure 12:
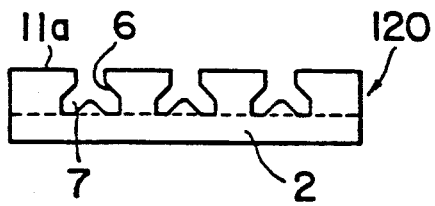

FIGS. 11-13 show a steel plate 2 of a composite structure 120 according to a still further embodiment of this invention, in which a plurality of grooves 7 are formed in the upper joining surface 11a of the steel plate 2 so as to linearly extend parallel with each other, and each groove 7 has a cross sectional shape substantially the same as that shown in FIG. 2. A plurality of other grooves 14 are formed in the upper joining surface 11a of the steel plate 2 so as to extend in a direction to intersect the grooves 7, for example, in a direction normal to the grooves 7 as shown in FIG. 11. FIGS. 12 and 13 are side views as seen in the directions of arrows XII and XIII of FIG. 11, respectively.

An aluminum plate 3 to be joined with the steel plate 2 shown in FIG. 11 has projections each having substantially the same configuration as that shown in FIG. 2 as well as underhang surfaces corresponding to the overhang surfaces 6 of the steel plate 2. The aluminum plate 3 of this embodiment is further provided with ridges to be firmly engaged with the grooves 14. According to this embodiment, the composite structure 120 is endowed with an increased resistance against external forces in the longitudinal direction of the groove 7 due to the existence of the additional grooves 14.

Figure 14:
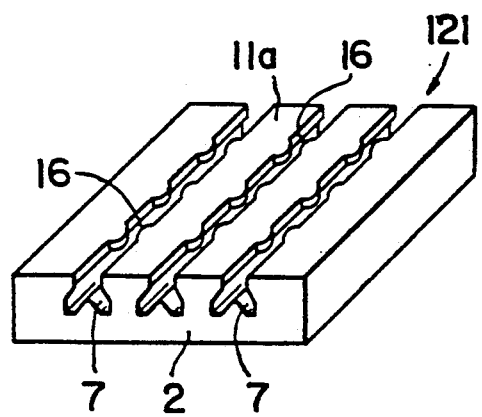
FIG. 14 is a perspective view showing a first material of a composite structure formed according to a still further embodiment of this invention.
Figure 15:
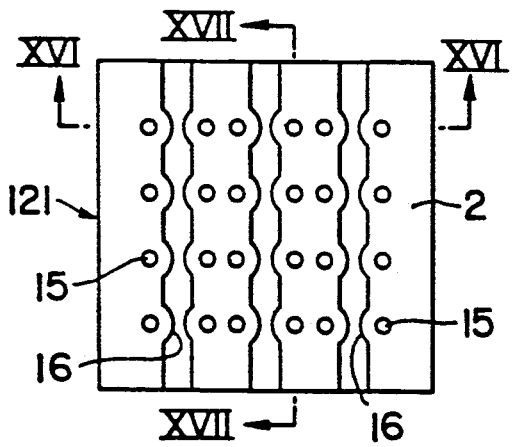
FIG. 15 is a plan view of a first material similar to the first material shown in FIG. 14.
Figure 17:
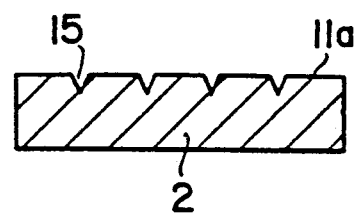
FIGS. 16 and 17 are sections taken along the lines XVI—XVI and XVII—XVII shown in FIG. 15, respectively.
Figure 16:
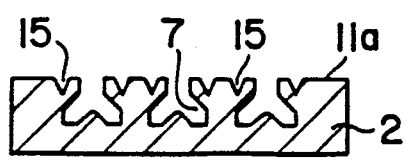

In a steel plate 2 of a composite structure 121 shown in FIG. 14, each groove 7 has protruding portions 16 in the shape of waves along the opening thereof at surface 11a. The wave-shaped protruding portions 16 can be formed, for example, by punched holes 15 shown in FIGS. 15 to 17. The formation of the punched holes 15 deforms the inner walls of the grooves 7 near the opening thereof so as to partially form inward protrusions 16 in wave form as shown in FIG. 15. FIGS. 16 and 17 illustrate cross sections of the steel plate 2 to show the shapes of the grooves 7 and the punched holes 15.

Figure 18:
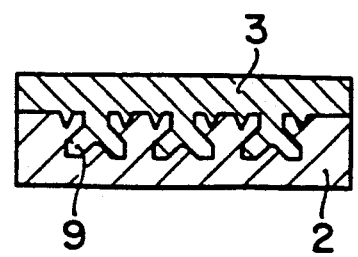
FIG. 18 is a sectional view illustrative of a composite structure in which a second material is firmly engaged with the material shown in FIG. 16.

FIG. 18 shows a cross section of the composite structure 121 constructed by joining an aluminum plate 3 to the steel plate 2 shown in FIG. 14. According to this embodiment, the aluminum plate 3 is strongly joined with the steel plate 2 by virtue of the existance of the additionally provided punched holes 15.

The embodiments shown in FIGS. 9 to 18 are advantageous in that the resistance against shearing forces in all directions along the interface can be increased.

It should be noted that the composite structures formed by this invention have been described hereinbefore with reference to the preferred embodiments, but the invention is not limited to these embodiments and other various changes or modifications may be made. For example, ridges or grooves may be formed in zigzag shape on the underhang surfaces and overhang surfaces in plural stages in the direction of height of the protrusions and of the depth of the recesses, respectively. Further, the soft steel plate 2 and the aluminum plate 3 may be replaced with other metallic plate members of different kinds, respectively.

Moreover, the composite structures according to this invention can be used not only as a secondary plate of a linear motor car track but also as composite structures requiring firm engagement between two plates or members, for example, for use in motor cars, machine tools, or as composite structures which are used under severe, violent conditions accompanied by sliding movements, vibrations or temperature variations.

According to the composite structures of the characters described above, a firm engaging state between two materials can be maintained stably even under great, frequently repeated shearing and separating forces imparted to the composite structures, with the result that the function or operation of a linear motor car, for instance, can be stably maintained as designed. In addition, the joining surfaces of the two metal plates are kept in a tightly bonded state in the manner of a labyrinth seal, so that separation of the two materials does not occur and any corrosive substance does not intrude to the interface even if the composite structure is exposed to a corrosive atmosphere.

The formation of the V-shaped grooves 7 having overhang surfaces 6 in the joining surface of the soft steel plate 2 can be made in accordance with methods described hereunder with reference to the accompanying drawings.

Figure 19:
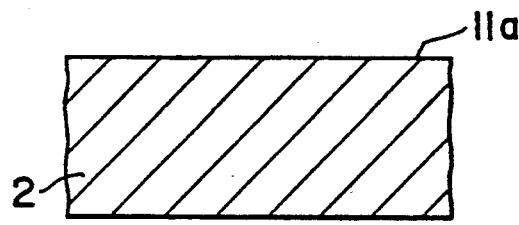
FIG. 19 is a cross sectional view of a first material in which a recess is to be formed.
Figure 20:
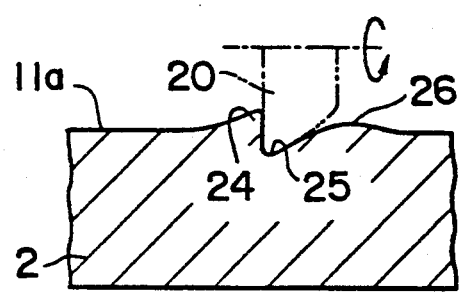
FIG. 20 is a cross sectional view showing a step to form a recess in the material shown in FIG. 19.

In a first method, a blank soft steel plate 2 having a flat joining surface 11a to be bonded or joined, as shown in FIG. 19, is first prepared, and a forming or formation roll 20 having flat opposite side surfaces and a circumferential surface provided therearound with a ridge formed so as to define a predetermined tapered peripheral surface is pressed with a predetermined pressure against the planar joining surface 11a of the steel plate 2 as shown in FIG. 20. When the formation roll 20 is rolled under such pressure condition, a sharply raised portion 24 is formed on the joining surface 11a at one side of the roll 20, as shown in FIG. 20, and simultaneously, a valley portion 25 and a slightly raised portion 26 are also formed below the formation roll 20 and at the other side thereof, respectively. The valley portion 25 flanked by the raised portion 24 of a predetermined height is formed by repeating the pressing process described above by means of the formation roll 20.

Figure 21:
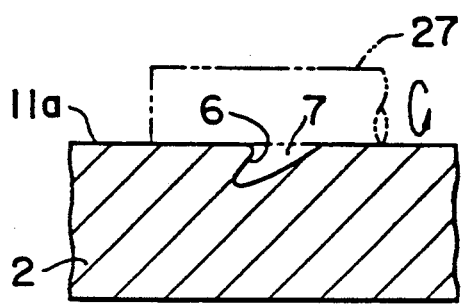
FIG. 21 is a cross sectional view representing a next step subsequent to the step shown in FIG. 20 to form the recess.

In the next step, as shown in FIG. 21, a cylindrical levelling roll 27 is rolled on the joining surface 11a in which the valley portion 25 has been formed by the pressing operation, and the raised portions 24 and 26 are flattened so as to accord with the level of the other general portion of the joining surface 11a, whereby a V-shaped groove or recess 7 having the overhang surface 6 can be thus formed without carrying out a troublesome and difficult machining operation for cutting a sloping V-shaped groove.

Figure 22:
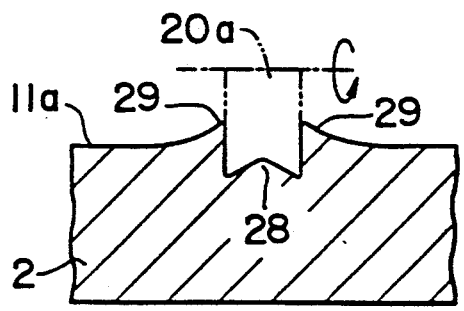
FIG. 22 is a cross sectional view showing a step to form a recess having a cross-sectional shape different from that shown in FIG. 20 in the material shown in FIG. 19.
Figure 23:
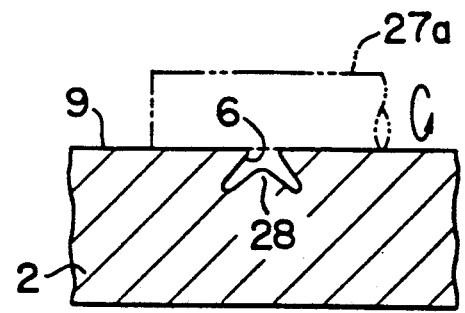
FIG. 23 is a cross sectional view showing a next step subsequent to the step shown in FIG. 22 to form the recess.

A method of formation of a groove 7 having such a shape as shown in FIG. 2 will be described with reference to FIG. 22. In this method, a pulley-type formation roll 20a is pressed against the joining surface 11a of the blank soft steel plate 2 shown in FIG. 19. When the formation roll 20a is rolled on the joining surface 11a while pressing the same, a groove having an intermediate ridge 28, substantially vertical side walls and raised portions 29 is formed, and by repeating such rolling step, a V-shaped valley portion for the groove and the raised portions 29 each having a predetermined height are formed.

In the next step, a cylindrical formation roll 27a is rolled by a predetermined number of revolutions on the joining surface 11a, the raised portions 29 thereby are pressed into a flat state, and a groove having overhang surfaces 6 sloping outwards with respect to the ridge portion 28 can be formed.

FIG. 24 is explanatory of a further method of forming grooves 7 in the joining surface of the steel plate 2. In this method a pulley-type formation roll 20a similar to that shown in FIG. 22 is utilized. A plurality of depressions 30 are formed in the outer surface of the roll 20a so as to extend in the axial direction in circumferentially equally spaced relation. When the formation roll 20a is rolled on the joining surface of the steel plate 2, protrusions 31 are formed at equal intervals on the bottom of the groove 7 as shown in FIG. 25. Instead of the depressions 30, protrusions may be provided, in which case, depressions are formed in the bottom of the groove 7.

According to this embodiment, the projections of the aluminum plate 3 can be firmly engaged with the protrusions 31 when the aluminum plate 3 is joined with the steel plate 2, and accordingly, resistance of the grooves 7 against external forces in the longitudinal direction thereof is increased.

The formation of the groove 7 or the projection 9 having a dovetail cross-sectional shape as shown in FIG. 4 can be made in a manner shown in FIGS. 26 to 28. A blank soft steel plate 2 having an upper joining surface 11a with a projection 40 preliminarily formed to have a rectangular cross section is first prepared. A formation roll 41 having therearound a groove of a substantially M-shaped cross section, as shown in FIG. 27, is pressed and rolled against the projection 40 in such a manner that the inner side walls of the M-shaped groove abut against the side walls of the projection 40. The formation roll 41 is rolled under such pressing condition by a predetermined number of revolutions to plastically form the projection 40 into an M-shaped projection 40'. In the next step, a formation roll 42 having a cylindrical configuration is pressed against the M-shaped projection 40' and rolled by a predetermined number of revolutions to form a projection 40" having an upper flat surface and overhang surfaces 43 on both sides thereof, whereby the projection 40" has a dovetail shape in cross section. According to this forming method, the dovetail-shaped projection can be easily formed as designed without carrying out a troublesome cutting operation.

As will be easily understood, a dovetail-shaped projection having underhang surfaces on both sides thereof to be engageable with the overhang surfaces 43 of the steel plate 2 can be formed on the joining surface of the aluminum plate 3 in substantially the same manner as that described with reference to the formation of the dovetail-shaped projection 40" of the steel plate 2.

FIGS. 29 to 31 are explanatory of another method of forming grooves, each having a shape similar to that shown in FIG. 4, in the joining surface of the steel plate. According to this method, as shown in FIG. 29, a formation roll provided with annular roll portions 45 having a substantially rectangular cross-sectional shape is pressed against and then rolled on the joining surface 11a of the steel plate 2 to effect plastic working and to form grooves therein with raised portions 46 on both sides thereof.

In the next step, as shown in FIG. 30, a roll 48 provided with circumferential grooves 47 of a substantially triangular cross section at portions corresponding to the locations of the grooves 7 of the steel plate 2 formed by the formation roll 45 is pressed and rolled so as to plastically deform the raised portions 46 towards the insides of the grooves 7 as denoted by the reference numeral 46'. In the final stage, as shown in FIG. 31, a formation roll 49 having a cylindrical configuration is pressed against and rolled on the joining surface 11a, and the raised portion 46' thus are further deformed inwardly to thereby form the grooves 7 each having the overhang surfaces 6 on both sides.

FIGS. 32 to 36 show a still further composite structure according to this invention and these figures are explanatory of a method of manufacturing this composite structure. FIG. 32A shows a soft steel plate 2 having local recesses 7 each in the form of a circular hole having an overhang surface 6 with a cross section shown in FIG. 32B instead of the groove shaped recesses mentioned hereinbefore with reference to the foregoing embodiments.

An aluminum plate 3 to be joined to the steel plate 2 shown in FIG. 32A is also provided with circular holes 51, as shown in FIG. 33A, each having an inverted frustconical cross section as shown in FIG. 33B. The location or arrangement of the holes 51 is of course designed to accord with the location of the recesses 7 of the steel plate 2 as shown in FIG. 34.

The thus prepared steel plate 2 and the aluminum plate 3 are superimposed in such a manner that the recesses 7 and holes 51 concentrically align with each other, and then an anchor material 52 made of a forgible soft material such as aluminum is inserted into each aligned pair of the hole 51 and recess 7 as shown in FIG. 35. The anchor material 52 is then deformed by, for example, forging to completely fill the holes 51 and the recesses 7 as shown at 52' in FIG. 36. The thus formed composite structure is firmly joined due to an anchoring effect. It is to be noted that the cross sections of the recess 7 and hole 51 need not be circular but can be rectangular, oval or of any other shape.

Figure 37:
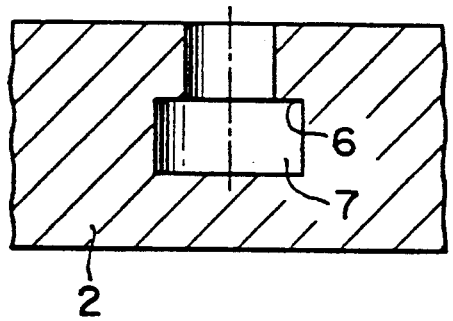
FIG. 37 is a fragmentary cross sectional view of a portion of a first material of a composite structure.

FIG. 37 shows a still further example of a steel plate 2 provided with recesses 7 each having a shape of a circular stepped hole with a lower portion having a diameter greater than that of an upper portion, the lower portion forming an overhang surface 6.

Figure 38:
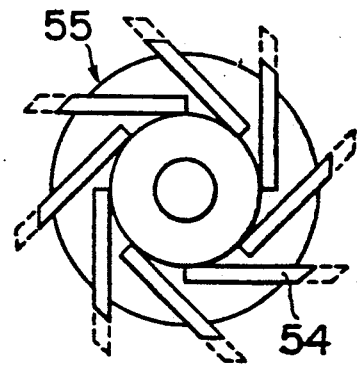
FIG. 38 is a plan view of a rotary cutter used for forming a recess shown in FIG. 37.
Figure 39:
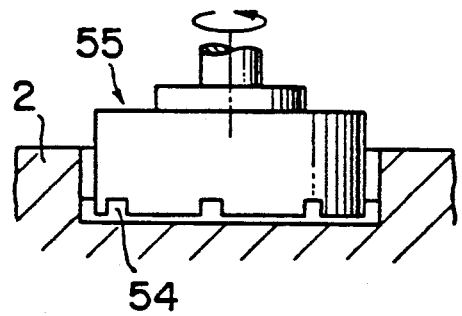
FIGS. 39 and 40 are views explanatory of steps in sequence of forming the recess by using the rotary cutter shown in FIG. 38.
Figure 40:
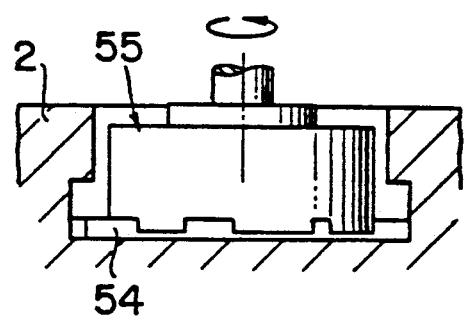

The formation of this hole 7 can be made by, for example, using a rotary cutter 55 of a type in which cutter blades 54 are shiftable between the positions shown by solid lines and the radially outwardly projecting positions shown by dotted lines in FIG. 38. In an actual operation, the rotary cutter 55 is placed on the joining surface 11a of the steel plate 2 and then rotated with the cutter blades 54 radially inwardly retracted to cut the plate 2 and form a circular hole as shown in FIG. 39. After the circular hole having a predetermined depth is formed, the cutter blades 54 are shifted or projected radially outwardly and again rotated to form an enlarged diameter hole portion as indicated in FIG. 40, thus forming a stepped hole as shown in FIG. 37.

A circular hole having such a cross section as shown in FIG. 32B may be formed by using the rotary cutter 55 while rotating the same with the cutter blades being radially outwardly moved gradually.

Figure 41:
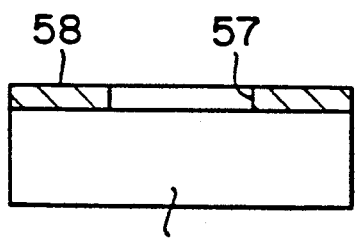
FIGS. 41 to 43 are views explanatory of steps in sequence of forming a recess in a first material of the composite structure, according to a still further method of this invention.
Figure 42:
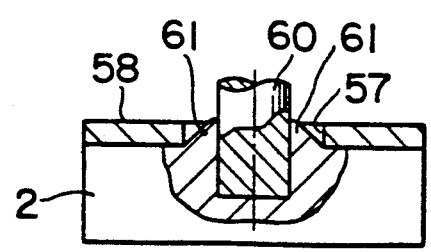
Figure 43:
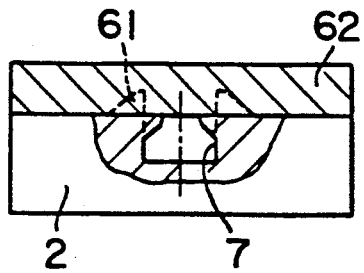

FIGS. 41 to 43 are explanatory of a still further method of the formation of the recesses 7 in the joining surface of the steel plate 2.

Referring to FIG. 41, a suppressing plate 58 provided with a plurality of circular holes 57 is first placed on the joining surface 11a of the steel plate 2, and in the next step, as shown in FIG. 42, a punch 60 having a diameter smaller than that of the hole 57 is inserted in the hole 57 and then thrust downwardly to form a punched hole in the steel plate 2. An annular raised portion 61 is formed along the periphery of the opening of the punched hole. Thereafter, the punch 60 is removed and a flat plate 62 is placed on the steel plate 2 and pressed downwardly to deform the raised portion 61 inwardly of the punched hole, thus forming a recess 7 having an annular overhang surface 6.

A steel plate 2 having grooves provided with the overhang surfaces formed by the methods described hereinbefore or a machining method can be firmly engaged or joined with an aluminum plate 3 having projections provided with the underhang surfaces in the manners and by the methods described hereunder.

Figure 44:
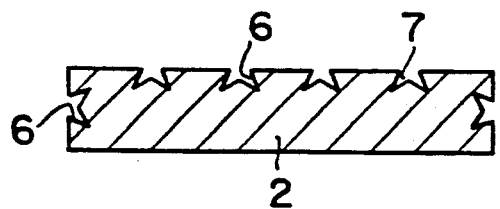
FIGS. 44 to 48 are views explanatory of steps in sequence of forming a composite structure by a casting method for joining two different materials.
Figure 45:
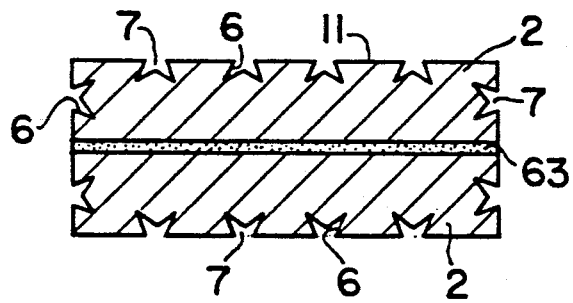
Figure 46:
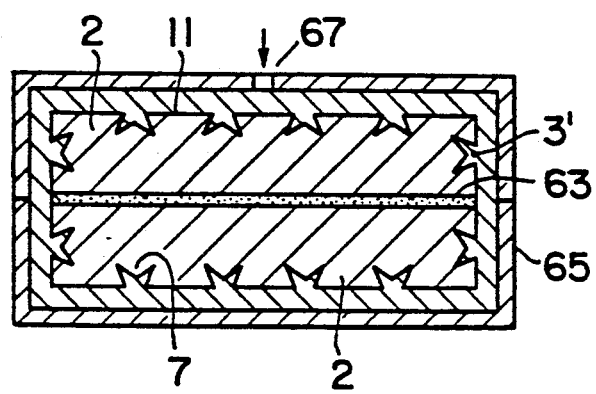

In order to fabricate the composite structure of the character shown in FIG. 2, for example, the grooves 7 having the overhang surfaces 6 are first formed in the upper surface and, in a certain case, in both side surfaces, of the soft steel plate 2 as shown in FIG. 44, and thereafter, a pair of the thus prepared metal plates 2 are integrally bonded at the opposing back surfaces thereof by a release agent 63 such as plaster, as shown in FIG. 45, for the purpose of mass production of the composite structure. The thus bonded steel plates 2 are then placed in a casting mold 65 as shown in FIG. 46 and a molten aluminum bath 3' is poured through a gate 67 of the mold 65 into a cavity defined between the inner wall of the mold 65 and the outer joining surfaces and the side surfaces of the bonded steel plates 2. During this process, care must be taken to entirely and completely charge the molten aluminum bath 3' over the entire overhang surfaces 6 of the grooves 7 of the steel plates 2.

Figure 47:
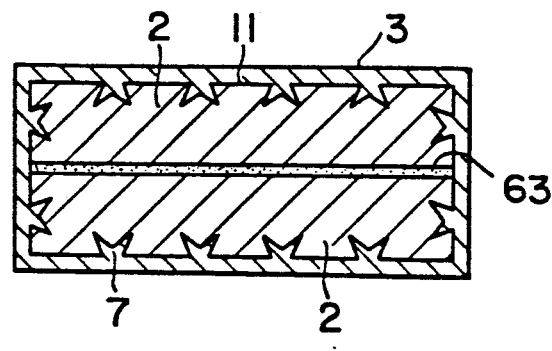
Figure 48:
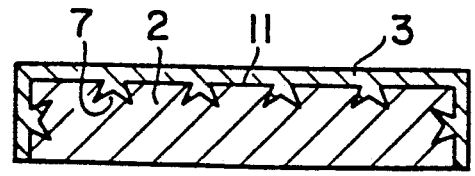

The mold 65 is opened, after a predetermined time has elapsed to cool and coagulate the aluminum molten bath 3', to obtain a block in which the aluminum material 3 covers the entire outer surfaces of the steel plates 2 and is completely charged into all of the grooves 7 of the steel plates 2 along the overhang surfaces 6 thereof, as shown in FIG. 47. The block is then cut along the release agent 63 to obtain secondary plates such as shown in FIG. 48.

In the embodiment described above, an anti-corrosion coating process can be interposed between the processes or steps carried out with reference to FIGS. 45 and 46 to form a corrosion proof film made of an insulating material for preventing electrolytic corrosion between the steel and aluminum materials, on the joining surfaces between the steel plate 2 and the aluminum plate 3. The coated steel plates 2 are thereafter placed in the mold 65 and the molten aluminum bath 3' is poured into the mold cavity in the same manner as described before.

It should be course be understood that one of the two different materials which is more easily fusible than the other can be fused and poured into the mold in the molding process described hereinbefore.

Firm bonding or joining between the steel plate 2 and the aluminum plate 3 may be performed by a method utilizing plastic flow described hereunder.

Figure 49:
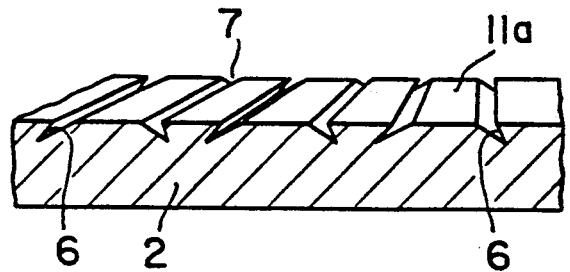
FIGS. 49 to 52 are views explanatory of steps in sequence of joining two different materials due to plastic flow of a first material to form a composite structure.
Figure 50:
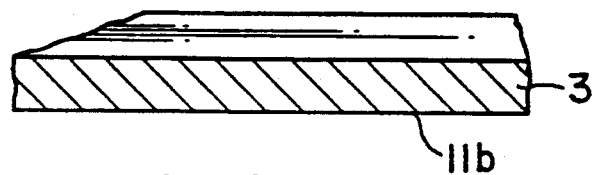

Before carrying out this method, a soft steel plate 2 with a joining surface 11a having grooves 7 provided with overhang surfaces 6, as shown in FIG. 49, is first prepared, while a flat aluminum plate 3 having a joining surface 11b as shown in FIG. 50 also is prepared.

Figure 51:
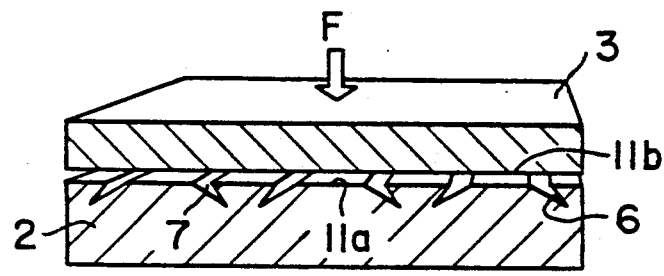
Figure 52:
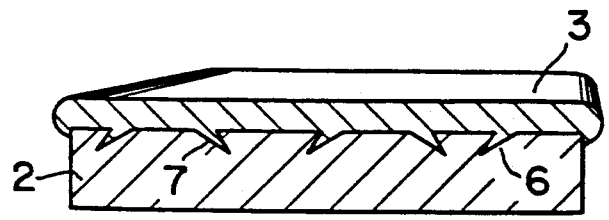

The thus prepared plates 2 and 3 are superimposed with their joining surfaces 11a and 11b opposed as shown in FIG. 51 and the two plates are pressed entirely uniformly by means of a pressing device or rolling device, not shown, in the direction of arrow F.

The application of the pressure in the direction F causes plastic flow of the aluminum material forming the joining surface 11b of the aluminum plate 3, which has a yielding point lower than that of the steel plate 2 (i.e. the aluminum of plate 3 is softer than the steel of plate 2), into the grooves 7 thereof, and continuous application of the pressure causes the aluminum material of the joining surface 11b to completely fill the grooves 7 along the entire overhang surfaces 6 thereof to achieve firm engagement of the plates 2 and 3, which is maintained even after the pressing force has been released.

The plastic flow of the material of the aluminum plate 3 into the grooves 7 of the steel plate 2 will be assisted by heating the joining surface 11b of the aluminum plate 3 by means of a high frequency heating device, for example, during the pressure application process.

A final product can be obtained by carrying out a trimming operation on the thus obtained composite block of the plates 2 and 3.

The composite structure 112 shown in FIG. 2 can also be manufactured by a method described below with reference to FIGS. 53 to 57.

Figure 53:
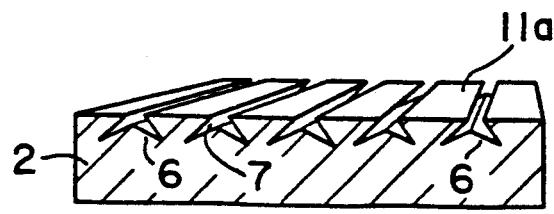
FIGS. 53 to 57 are views explanatory of other steps in sequence of joining two different materials due to plastic flow of a first material to form a composite structure.
Figure 54:
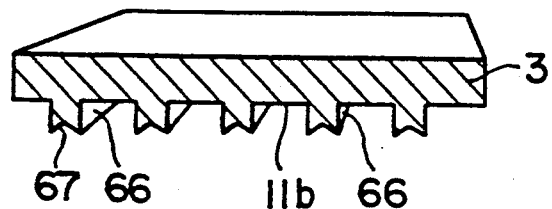

According to this manufacturing method, a soft steel plate 2 having a joining surface 11a in which grooves 7 provided with overhang surfaces 6 are formed preliminarily is first prepared as shown in FIG. 53, while an aluminum plate 3 having a joining surface 11b on which projections 66 are preliminarily formed at positions corresponding to the grooves 7 as shown in FIG. 54 also is prepared. The tip end of each projection 66 is formed with a groove 67 of V-shaped cross section. This shape of the projections 66 is substantially the same as the projection 40' formed in the process step shown in FIG. 27. The aluminum plate 3 of FIG. 54 can be obtained as a section of the desired profile available in the market. It is desirable that the volumetric amount of each projection 66 on the joining surface 11b be slightly greater than the volumetric amount of each groove 7 of the steel plate 2.

Figure 55:
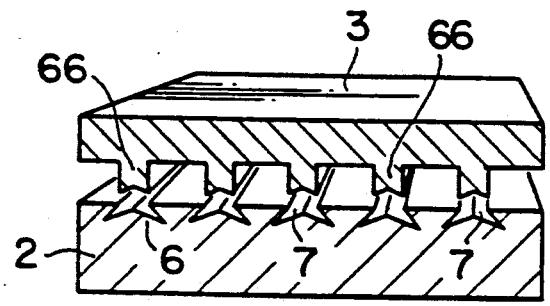
Figure 56:
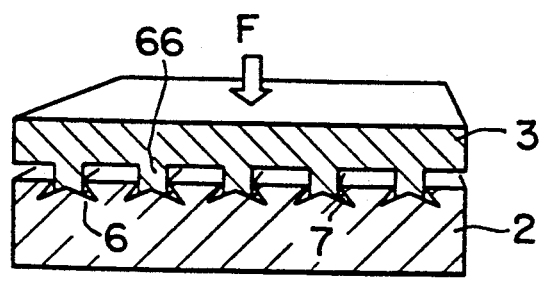
Figure 57:
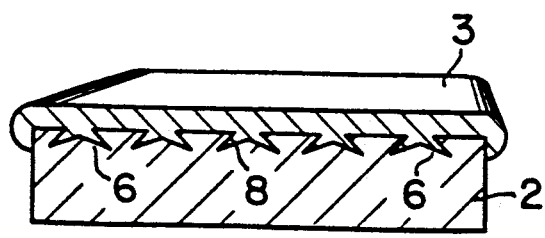

In the next step, as shown in FIG. 55, the aluminum plate 3 and the metal plate 2 are arranged to oppose to each other so as to achieve a positional alignment of the corresponding projections 66 and grooves 7, respectively. Thereafter, the tip end of each projection 66 is fitted into each groove 7 as shown in FIG. 56, and a pressing force F is applied uniformly to the entire aluminum plate 3 towards the metal plate 2 by means of a pressing device or rolling device. The application of the pressing force F causes plastic flow of the aluminum material forming the projections 66 of the aluminum plate 3 as described with reference to the former embodiment, and the aluminum material of the projections 66 is charged into the grooves 7 of the steel plate 2 along the entire overhang surfaces 6 as shown in FIG. 57.

During this pressure application process, the plastic flow of the aluminum material into the grooves 7 along the overhang surfaces 6 can be more effectively achieved by a cotter function due to the presence of inclined surfaces of projections formed on the bottoms of the grooves 7. In addition, the plastic flow of the material of the aluminum plate 3 upon the application of the pressing force F can be attained more precisely due to the fact that the volumetric amount of each projection 66 on the joining surface 11b of the aluminum plate 3 is designed to be slightly greater than the volumetric amount of the corresponding groove 7, whereby firm mechanical engagement between the aluminum plate 3 and the steel plate 2 is realized.

The plastic flow of the aluminum material can be effected more precisely by heating the projections 66 to a predetermined temperature to reduce the yielding stress of the aluminum plate 3 during the pressure applying process as described with reference to the former embodiment. Furthermore, even after the projections 66 have contracted due to cooling during the pressure applying process, complete filling of the aluminum material into the grooves is attained since the volumetric amount of the projections 66 is made slightly greater than that of the grooves 7. That is, the flow of the aluminum material into the grooves 7 after contraction can be achieved without leaving vacant spaces or gaps therebetween, thus attaining firm mechanical engagement between the aluminum plate 3 and the steel plate 2.

In the thus manufactured composite structure, since the area of joining of the aluminum plate 3 to the soft steel plate 2 is enlarged, the composite structure can be endowed with a strong resisting force against horizontal shearing displacement and vertical separating displacement.

A still further joining method for manufacturing a composite structure will be described with reference to FIGS. 58 through 62.

Figure 58:
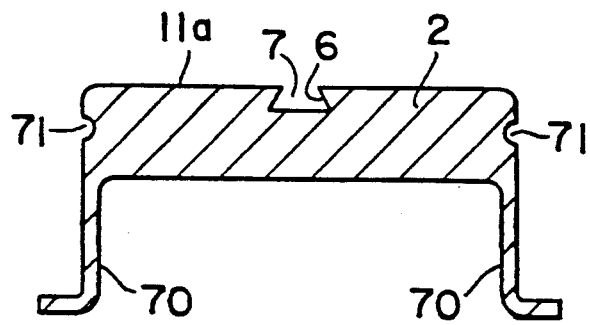

A soft steel plate 2, as shown in FIG. 58, is preliminarily prepared, which plate has stands 70 for attaching the plate 2 to a tie of a railway track for a linear motor car. A groove 7 is formed in the upper joining surface 11a of the steel plate 2 so as to have overhang surfaces 6 extending centrally in the longitudinal direction of the plate 2. A pair of grooves 71 each having an arcuate cross section are formed in both side surfaces of the plate 2.

Figure 59:
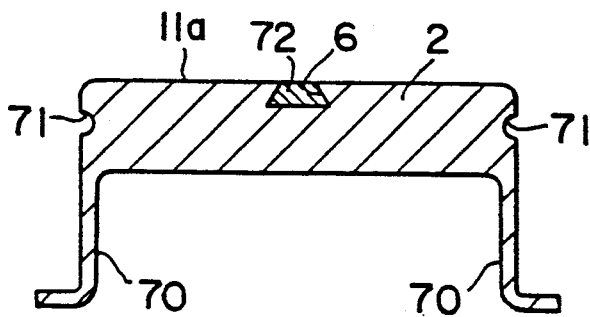

In the next step, as shown in FIG. 59, a bar-like member 72 made of aluminum material having a trapezoidal cross sectional shape corresponding to that of the groove 7 shown in FIG. 58 is press fitted longitudinally into the groove 7. Alternatively molten aluminum may be cast into the groove 7 to form an aluminum bar integral with the steel plate 2 instead of the fitting of the preliminarily made aluminum bar 72.

Figure 60:
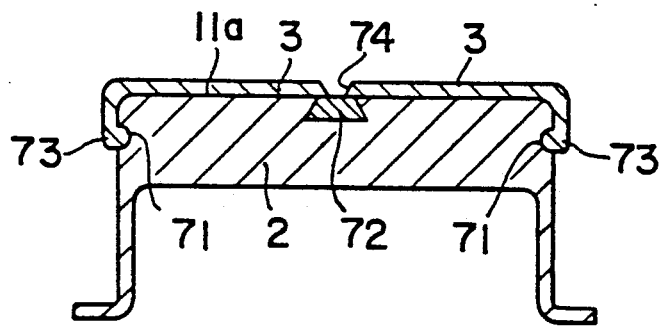

A pair of aluminum plates 3 are prepared, each of substantially L-shaped cross section having on one end a bead 73 engageable with the groove 71 and at the other end a tapered end surface 74. The thus prepared aluminum plates 3 are preliminarily expanded by heating to a predetermined temperature and then mounted on the upper surface of the steel plate 2 in such a manner that the respective beads 73 are engaged with the corresponding grooves 71 of the steel plate 2 and the tapered end surfaces 74 are positioned above the ovehang surfaces 6 in an opposing state to each other with a space interposed therebetween as shown in FIG. 60.

Figure 61:
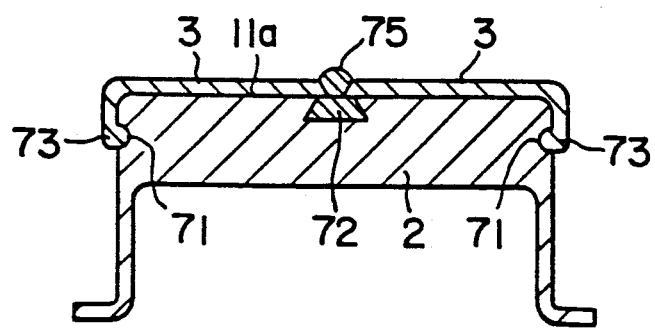

In the next step, as shown in FIG. 61, an aluminum material is welded into the space defined above the upper surface of the aluminum bar 72 between the tapered end surfaces of the aluminum plates 3 so as to form a build-up weld 75 to thereby integrally join the steel plate 2, the aluminum bar 72 and the aluminum plates 3 by the build-up weld 75.

After these processes, the thus joined structure is allowed to cool, and during such cooling process, the aluminum plates 3 contract in the width directions due to the cooling of the plates 3 and the thermal contraction of the build-up weld 75. As a result, the beads 73 of the aluminum plates 3 strongly engage or bite into the grooves 71, thus achieving firm engagement between the aluminum plates 3 and the steel plate 2. Finally, a surface finish operation such as finish cutting is effected to the build-up weld 75 to obtain as a final product a secondary plate such as shown in FIG. 62.

The secondary plate as a final product provides a firm engagement of the aluminum plates 3 with the steel plate 2, which can be maintained for a long time and also provides a strong resisting force against shearing deformation in a horizontal direction and separating forces in a vertical direction.

A further modified method of manufacturing a composite structure will be described hereunder with reference to FIGS. 63 to 65, in which like reference numerals are used to designate portions or members corresponding to those shown in FIGS. 58 to 62.

As shown in FIG. 63, in this modification, the bar like aluminum member is not fitted in the groove 7 having the overhang surfaces 6 centrally extending in the longitudinal directions of the steel plate 2. A pair of aluminum plates 3 are placed on the upper joining surface 11a of the plate 2 in such a manner that each of the aluminum plates 3 has one end (bead) 73 engaged with the side groove 71 of the steel plate 2 and the other end 76 formed as a flanged portion projecting into the groove 7. In the next step, as shown in FIG. 64, an molten aluminum bath 77 is filled to form a build-up portion in and above a space defined by both the flanged portions 76 and the inner wall of the groove 7. The bath 77 is left as it is until it cools. The aluminum plates 3 can be thermally contracted during the cooling process by preliminarily heating the same, and due to such contraction, the beads 73 firmly bite into the grooves 71 to realize firm mechanical engagement between the aluminum plates 3 and the steel plate 2, which are, on the other hand, bonded through the solidified bath 77.

A surface finishing operation such as finish cutting is performed as shown in FIG. 65 to obtain a flush surface of the aluminum plates 3 and the solidified bath, whereby there is obtained as a finished product a composite structure of substantially the same character as that of the composite structure shown in FIG. 61 with excellent or superior structural advantages described hereinbefore with respect to the former embodiments.

The methods of forming the recesses in the first material, as described hereinbefore, can be used in any type of the composite structures described hereinbefore.

What is claimed is:

1. A method of manufacturing a composite structure made from a pair of materials of different types mechanically joined to each other, said method comprising the steps of:

providing a first material having a planar first joining surface;

providing a second material softer than said first material and having a second joining surface;

rolling and pressing on the first joining surface a first formation roll having radially protruding parallel annular roll portions of a substantially rectangular cross-sectional shape, thereby forming in said first joining surface parallel grooves each having parallel side walls, and simultaneously forming raised portions on said first joining surface along opposite longitudinal sides of each of said grooves due to plastic flow of said first material adjacent each said groove as said annular roll portions are pressed to form the respective grooves;

then rolling and pressing on the first joining surface a second formation roll having parallel circumferential grooves of a substantially triangular cross-sectional shape, with respective said circumferential grooves coinciding in position with respective said grooves in the first joining surface, to thereby plastically deform said raised portions inwardly of each groove in the first joining surface to thereby form the side walls of each groove into overhang side walls;

thereafter rolling and pressing a third formation roll of cylindrical configuration on the first joining surface to make it planar and to form completed overhang grooves;

opposing said first and second joining surfaces of the first and second materials; and pressing said first and second materials against each other to cause forced plastic flow of said softer second material into said overhang grooves in said first material in a manner fully filling said overhang grooves, thereby obtaining firm engagement between said first and second materials.

2. A method of manufacturing a composite structure made from a pair of materials of different types mechanically joined to each other, said method comprising the steps of:

providing a first material having a planar first joining surface;

providing a second material softer than said first material and having a second joining surface;

rolling and pressing on said first joining surface a formation roll having flat opposite side surfaces and a tapered peripheral surface defining a circumferential ridge of V-shaped cross section, thereby forming in said first joining surface a groove of a substantially V-shaped cross section having an upright side wall and an opposite sloping side wall defining a valley portion of said groove, and simultaneously forming a raised portion on said first joining surface along said upright side wall of the groove due to plastic flow of said first material adjacent said groove as said formation roll is pressed to form said groove;

then rolling and pressing a cylindrical formation roll on said first joining surface to plastically deform said raised portion inwardly of said groove, to thereby make said first joining surface planar and to form said upright side wall into an overhang side wall, thus forming a completed overhang groove;

opposing said first and second joining surfaces of said first and second materials; and pressing said first and second materials against each other to cause forced plastic flow of said softer second material into said overhang groove in the first material in a manner fully filling said overhang groove, thereby obtaining firm engagement between said first and second materials.

3. A method of manufacturing a composite structure made from a pair of materials of different types mechanically joined to each other, said comprising the steps of:

providing a first material having a planar first joining surface;

providing a second material softer than said first material and having a second joining surface;

rolling and pressing on said first joining surface a pulley-type formation roll having flat opposite side surfaces and a peripheral surface with a circumferential groove of a V-shaped cross section, thereby forming in said first joining surface a groove having parallel side walls and a bottom ridge, and simultaneously forming raised portions on said first joining surface along opposite longitudinal sides of said groove due to plastic flow of said first material adjacent said groove as said formation roll is pressed to form said groove;

then rolling and pressing on said first joining surface a cylindrical formation roll to plastically deform said raised portions inwardly of said groove in said first joining surface, to thereby form said side walls of said groove into overhang side walls and to form a completed overhang groove;

opposing said first and second joining surfaces of said first and second materials; and pressing said first and second materials against each other to cause forced plastic flow of said softer second material into said overhang groove in said first material in a manner fully filling said overhang groove, thereby obtaining firm engagement between said first and second materials.

4. A method of forming grooves having overhang side walls in an outer surface of a metal member, said method comprising the steps of:

rolling and pressing on said outer surface a first formation roll having radially protruding parallel annular roll portions of a substantially rectangular cross-sectional shape, thereby forming in said outer surface parallel grooves each having parallel side walls, and substantially forming raised portions on said outer surface along opposite longitudinal sides of each of said grooves due to plastic flow of said metal member adjacent each said groove as said annular roll portions are pressed to form the respective grooves;

then rolling and pressing on said outer surface a second formation roll having parallel circumferential grooves of a substantially triangular cross-sectional shape, with respective said circumferential grooves coinciding in position with respective said grooves in said outer surface, to thereby plastically deform said raised portions inwardly of each groove in said outer surface to thereby form the side walls of each groove into overhang side walls; and thereafter rolling and pressing a third formation roll of cylindrical configuration on said outer surface to make it planar.

5. A method of forming an overhang groove in an outer surface of a metal member, said method comprising the steps of:

rolling and pressing on said outer surface a formation roll having flat opposite side surfaces and a tapered peripheral surface defining a circumferential ridge of V-shaped cross section, thereby forming in said outer surface a groove of a substantially V-shaped cross section having an upright side wall and an opposite sloping side wall defining a valley portion of said groove, and simultaneously forming a raised portion on said outer surface along said upright side wall of said groove due to plastic flow of said metal member adjacent said groove as said formation roll is pressed to form said groove; and then rolling and pressing a cylindrical formation roll on said outer surface to plastically deform said raised portion inwardly of said groove, to thereby make said outer surface planar and to form said upright side wall into an overhang side wall, thus completing said overhang groove.

6. A method of forming an overhang groove in an outer surface of a metal member, said method comprising the steps of:

rolling and pressing on said outer surface a pulley-type formation roll having flat opposite side surfaces and a peripheral surface with a circumferential groove of a V-shaped cross section, thereby forming in said outer surface a groove having parallel side walls and a bottom ridge, and simultaneously forming raised portions on said outer surface along opposite longitudinal sides of said groove due to plastic flow of said metal member adjacent said groove as said formation roll is pressed to form said groove; and then rolling and pressing on said outer surface a cylindrical formation roll to plastically deform said raised portions inwardly of said groove in said outer surface, to thereby form said side walls of said groove into overhang side walls, thus completing said overhang groove.

* * * * *